United States Patent
Ho

(10) Patent No.: US 9,684,530 B2
(45) Date of Patent: Jun. 20, 2017

(54) SYSTEM AND METHOD FOR ASSIGNING VIRTUAL FUNCTIONS AND MANAGEMENT HOST THEREOF

(71) Applicant: VIA Technologies, Inc., New Taipei (TW)

(72) Inventor: Kuan-Jui Ho, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 578 days.

(21) Appl. No.: 14/267,931

(22) Filed: May 2, 2014

(65) Prior Publication Data
US 2015/0254093 A1    Sep. 10, 2015

(30) Foreign Application Priority Data

Mar. 5, 2014 (TW) .............................. 103107450 A

(51) Int. Cl.
G06F 9/455 (2006.01)
(52) U.S. Cl.
CPC ............... *G06F 9/45558* (2013.01); *G06F 2009/45579* (2013.01)
(58) Field of Classification Search
CPC .................................................. G06F 9/45558
USPC ............................................................ 710/313
See application file for complete search history.

(56) References Cited

U.S. PATENT DOCUMENTS

| 2006/0242353 | A1* | 10/2006 | Torudbakken | G06F 13/4022 710/316 |
| 2012/0096192 | A1* | 4/2012 | Tanaka | G06F 13/385 710/20 |
| 2012/0102491 | A1 | 4/2012 | Maharana | |
| 2012/0131201 | A1* | 5/2012 | Matthews | G06F 13/4081 709/226 |

(Continued)

FOREIGN PATENT DOCUMENTS

| CN | 102722458 | 10/2012 |
| TW | 201025025 | 7/2010 |

OTHER PUBLICATIONS

Suzuki et al., "Multi-Root Share of Single-Root I/O Virtualization (SR-IOV) Compliant PCI Express Device," 2010 18th IEEE Symposium on High Performance Interconnects, Aug. 2010, pp. 25-31.

(Continued)

*Primary Examiner* — Tim T Vo
*Assistant Examiner* — Herve Iradukunda
(74) *Attorney, Agent, or Firm* — Jianq Chyun IP Office

(57) ABSTRACT

A system and a method for assigning virtual functions, and a management host thereof are provided. The management host is connected with a computer host through a bridge and has at least one virtual function. A management processor of the management host updates a mapping table according to a virtual function establishing request to assign the at least one virtual function to the computer host according to the mapping table, wherein the management processor determines whether to establish the virtual function according to the mapping table. The management processor transmits a (Continued)

hot-plug event to the corresponding computer host via a switch according to an assignment result and connects the virtual function with the corresponding computer host to dynamically adjust an allocation of the virtual function.

36 Claims, 5 Drawing Sheets

(56) References Cited

U.S. PATENT DOCUMENTS

2012/0166690 A1   6/2012   Regula

OTHER PUBLICATIONS

"Office Action of Taiwan Counterpart Application", issued on Mar. 29, 2016, p. 1-p. 8, in which the listed references were cited.

* cited by examiner

SYSTEM AND METHOD FOR ASSIGNING VIRTUAL FUNCTIONS AND MANAGEMENT HOST THEREOF

CROSS-REFERENCE TO RELATED APPLICATION

This application claims the priority benefit of Taiwan application serial no. 103107450, filed on Mar. 5, 2014. The entirety of the above-mentioned patent application is hereby incorporated by reference herein and made a part of this specification.

BACKGROUND OF THE INVENTION

Field of the Invention

The invention relates to a virtualization technique of a computer system, and more particularly, relates to a system and a method for dynamically assigning virtual functions, and a management host thereof.

Description of Related Art

A computer system (e.g. a desktop or laptop computer) requires a bus to perform data transmission with a peripheral component. With the rapid development of serial communication technology, peripheral component interconnection express (PCIE) having the advantage of high transmission rate gradually replaces peripheral component interconnection (PCI) and becomes the dominant transmission interface for peripheral component.

In recent years, due to the rapid progress in the development of Internet, users have growing demands for information services, which imposes a heavier burden on the server. Therefore, in order to reduce costs and efficiently use the resources, server virtualization technology has gradually become the trend. In terms of the specification of PCIE, single root I/O virtualization (SR-IOV) is one effective solution for server virtualization. The SR-IOV technology allows a physical host (e.g. computer host) to assign multiple virtual functions (VF) to different virtual machines. However, the SR-IOV technology is limited and can only support one single physical host. In other words, multiple virtual machines in one physical host can use the virtual functions simultaneously, but the virtual functions cannot be assigned to the virtual machines in different physical hosts at the same time. By contrast thereto, the multi-root I/O virtualization (MR-IOV) technology can virtualize hardware resources to support multiple physical hosts. However, equipment that conforms to the SR-IOV technology is not completely compatible to the server architecture of the MR-IOV technology. As a result, the equipment conforming to the SR-IOV technology has low practicality. Hence, it is necessary to develop an effective virtual function assigning technique.

SUMMARY OF THE INVENTION

The invention provides a virtual function assigning system, a virtual function assigning method, and a management host thereof for effectively assigning virtual functions (VF) to multiple hosts.

The invention provides a virtual function assigning system that includes a computer host and a management host. The management host is connected with the computer host through a bridge and has at least one virtual function. The management host updates a mapping table according to a virtual function establishing request to assign the at least one virtual function to the computer host. The management host determines whether to establish the at least one virtual function according to the mapping table. The management host transmits a hot-plug event to the corresponding computer host according to an assignment result and connects the at least one virtual function with the corresponding computer host, such that the management host dynamically adjusts an allocation of the at least one virtual function.

From another aspect, the invention provides a virtual function assigning method that includes the following. A mapping table is updated according to a virtual function establishing request to assign a virtual function to a computer host. Whether to establish the virtual function is determined according to the mapping table. A hot-plug event is transmitted to the corresponding computer host according to an assignment result. The virtual function is connected with the corresponding computer host to dynamically adjust an allocation of the virtual function.

From another aspect, the invention provides a management host that includes a switch, an I/O virtualization device, and a management processor. The switch includes a bridge that is respectively coupled to a corresponding computer host. The I/O virtualization device is coupled to the switch and has a virtual function. The management processor is coupled to the switch and updates a mapping table according to a virtual function establishing request to assign the virtual function to the computer host. The management processor determines whether to establish the virtual function according to the mapping table. The management processor transmits a hot-plug event to the corresponding computer host through the switch according to an assignment result and connects the virtual function with the corresponding computer host through the switch, such that the management processor dynamically adjusts an allocation of the virtual function.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In order to effectively assign virtual functions (VF) to multiple computer hosts and dynamically expand the virtual functions, the embodiments of the invention provide a system and a method for dynamically assigning the virtual functions, and a management host thereof. Through a bridge disposed in the management host, the computer host is notified of a hot-plug event. Next, the computer host sends a configuration command (e.g. a read command) based on this hot-plug event, and again through the bridge, a management processor in the management host assigns the virtual functions of an I/O virtualization device to the computer host according to a mapping table. Further to the above, in the invention, a pseudo bridge that supports a hot-plug function is established by software simulation, such that the pseudo bridge can further connect other virtual functions pursuant to the user's needs to flexibly expand the virtual functions. Thus, according to the invention, the virtual functions are dynamically and effectively assigned, so as to assign the virtual functions of a single root I/O virtualization (SR-IOV) device to multiple computer hosts to achieve the maximum efficiency in assigning hardware resources.

Figure 1:
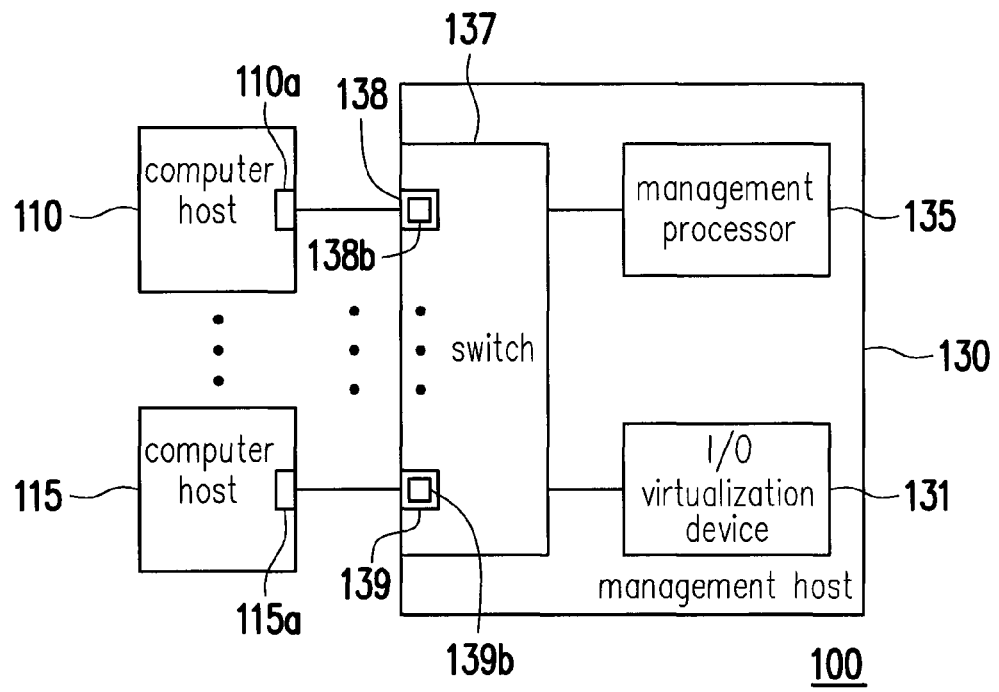
FIG. 1 is a block diagram illustrating a virtual function assigning system according to an embodiment of the invention.

FIG. 1 is a block diagram illustrating a virtual function assigning system according to an embodiment of the invention. With reference to FIG. 1, a virtual function assigning system 100 includes a computer host 110, a computer host 115, and a management host 130.

The computer host 110 or 115 may be an electronic device, such as a desktop computer or a laptop computer that includes a central processing unit (CPU) or other programmable microprocessors for general use or special use, a digital signal processor (DSP), a programmable controller, or an application specific integrated circuit (ASIC). It is noted that, in this embodiment, the computer hosts 110 and 115 further include a chip, such as a south bridge chip set, a north bridge chip set, etc., which is capable of processing signal transmission for each component/equipment in the computer hosts 110 and 115.

In this embodiment, the computer hosts 110 and 115 and the management host 130 support the peripheral component interconnection express (PCIe) specification. Electrical connection, communication, detection, and access between the computer hosts 110 and 115 and the management host 130 may be carried out by means of a cable used with a PCIe connector, or by plugging the PCIe connector of the computer hosts 110 and 115 in a PCIe slot of the management host 130. Nevertheless, the embodiment of the invention is not intended to limit a method of coupling the computer hosts 110 and 115 and the management host 130. Different coupling methods may be adopted depending on a transmission interface used in the embodiment.

In this embodiment, the management host 130 includes an I/O virtualization device 131, a management processor 135, and a switch 137. The I/O virtualization device 131 may be a component such as a network adapter that supports the SR-IOV technology. Generally speaking, the I/O virtualization device 131 that supports the SR-IOV technology may have one or a plurality of PCIe physical functions (PF), and each of the physical functions may correspond to at least one virtual function (VF), wherein the virtual function may be provided for a virtual machine, and one physical function corresponds to 64 virtual functions, for example. Although the SR-IOV technology allows multiple virtual machines to use the virtual functions of the I/O virtualization device 131, only one computer host (e.g. one of the computer hosts 110 and 115) is supported. In order to overcome the limitation of the SR-IOV technology, the management host 130 may utilize a non-transparent bridge (NTB) and assign the virtual functions of the I/O virtualization device 131 to the computer hosts 110 and 115 according to a preset mapping table, such that the I/O virtualization device 131 can be used by the computer hosts 110 and 115 simultaneously. The non-transparent bridge and the mapping table overcome the limitation of use of only one computer host. However, the non-transparent bridge does not provide a function of flexibly expanding the virtual functions. That is to say, if the user's demands change (for example, the user may plug the network adapter in the non-transparent bridge using the hot-plug function and attempt to use the virtual function provided by the network adapter in the computer host), since the preset mapping table does not include the related information, this virtual function cannot be used. In view of the above, the invention establishes a pseudo bridge that supports the hot-plug function by triggering a hot-plug event and using software simulation, such that the management host 130 is capable of dynamically assigning the virtual functions.

Referring to FIG. 1 again, the management processor 135 may be a central processing unit (CPU), a programmable microprocessor for general use or special use, a digital signal processor (DSP), a programmable controller, an application specific integrated circuit (ASIC), other similar components, or a combination of the foregoing. In this embodiment, the management processor 135 is configured to process all operations of the management host 130 in this embodiment. In addition, the management processor 135 may obtain available virtual functions in the management host 130 and the number of the available virtual functions. The management processor 135 may also obtain available computer hosts and the number of the available computer hosts. In this embodiment, two computer hosts 110 and 115 are illustrated as examples; however, the invention is not limited thereto. The management processor 135 may establish the mapping table according to the capability of the computer hosts 110 and 115 and the virtual functions (e.g. computing speed, memory size, etc.) or a virtual machine establishing request transmitted by an upper level software, so as to assign the virtual functions to the computer hosts 110 and 115 according to the mapping table. The mapping table includes a PCI configuration space address (e.g. a Bus/Device/Function address) of each virtual function, to which the computer hosts 110 and 115 correspond.

The switch 137 may be a PCIe switch or other types of switches that support the PCIe specification. The switch 137 includes bridges 138 and 139. From the aspect of the computer hosts 110 and 115, the bridges 138 and 139 may be deemed as PCI-to-PCI (P2P) bridges; and from the aspect of the management processor 135, the bridges 138 and 139 may be deemed as non-transparent bridges (NTB). Two ends of the bridges 138 and 139 are respectively connected with the computer hosts 110 and 115 and the management host 131, and therefore each has a PCI domain. Thus, it is required to perform address translation for the two PCI domains according to the mapping table. Moreover, the bridges 138 and 139 are respectively coupled to root ports 110a and 115a of the corresponding computer hosts 110 and 115. The bridges 138 and 139 may be physical bridges having the Bus/Device/Function addresses. Further, in order to respond to the user's demands for changing the virtual functions, in an embodiment, the bridges 138 and 139 may be respectively provided with status registers 138b and 139b of hot-plug event. When the management processor 135 obtains that the user's demands change, the related information is written to the status registers 138b and 139b, and the computer hosts 110 and 115 perform polling on the corresponding status registers 138b and 139b in sequence, so as to be notified of the hot-plug event. In other words, the management processor 135 provides status registers 138b and 139b be polling by computer host s 110 and 115. In another embodiment, the bridges 138 and 139 are further provided with input pins for receiving a message, with regard to the change of the user's demands, sent from the management processor 135. In addition, the bridges 138 and 139 may be provided with output pins (e.g. GPIO pins) for notifying the corresponding computer hosts 110 and 115 of the hot-plug event. In yet another embodiment, the management processor 135 may send a message in a specific format (e.g. PCIe transaction layer packet (TLP)) to the bridges 138 and 139 for the bridges 138 and 139 to send an interrupt message to notify the corresponding computer hosts 110 and 115 of the hot-plug event.

Figure 2:
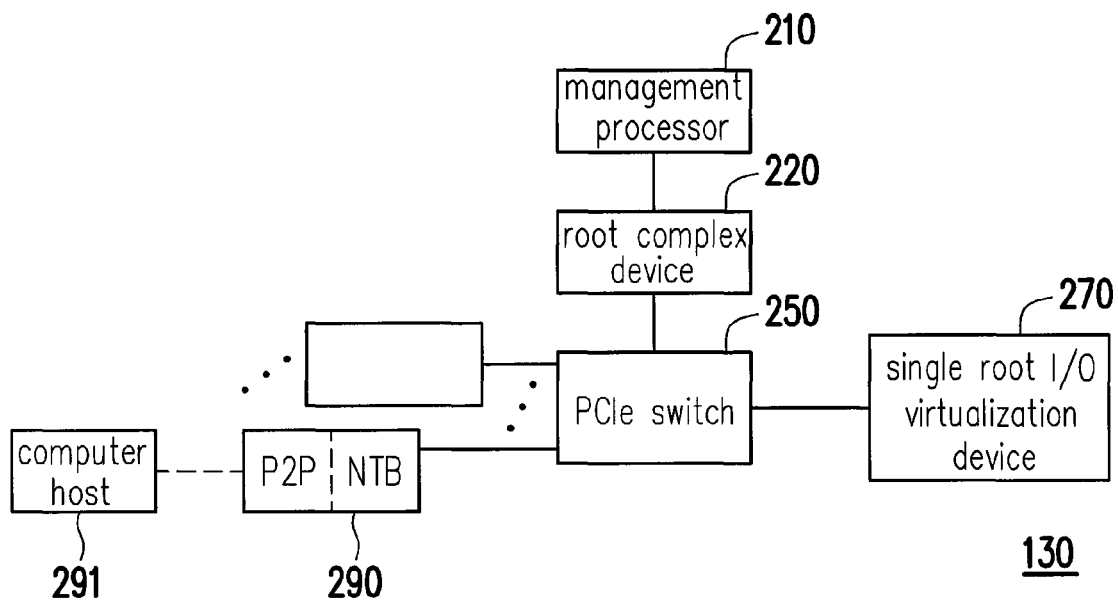
FIG. 2 illustrates an example of a management host according to an embodiment of the invention.

FIG. 2 illustrates an example of the management host 130 of FIG. 1 according to an embodiment of the invention. In this embodiment, a management processor 210 in the management host 130 controls a PCIe switch 250 through a root complex device 220. The PCIe switch 250 is connected with a single root I/O virtualization device 270 and a plurality of bridges 290, wherein the bridges 290 may be connected with a corresponding computer host 291. From the aspect of the computer host 291, the bridge 290 may be deemed as a P2P bridge; and from the aspect of the management processor 210, the bridge 290 may be deemed as a non-transparent bridge (NTB). In this embodiment, the management processor 210 may be deemed as an embodiment of the management processor 135 of FIG. 1. In this embodiment, the PCIe switch 250 may be deemed as an embodiment of the switch 137 of FIG. 1. The single root I/O virtualization device 270 may be deemed as an embodiment of the I/O virtualization device 131 of FIG. 1. The bridge 290 may be deemed as an embodiment of the bridges 138 and 139 of FIG. 1. The computer host 291 may be deemed as an embodiment of the computer hosts 110 and 115 of FIG. 1. Moreover, the root complex device 220 may be deemed as a part of the management processor 135 or a part of the switch 137 of FIG. 1.

Three embodiments are given below to explain how the invention flexibly expands the virtual functions. In these embodiments, only one computer host is connected as an example. It is noted that these embodiments are provided for illustrative purpose, and those skilled in the art may combine and apply the disclosure of these embodiments as appropriate. Thus, the following disclosure should not be construed as a limitation to the invention.

Figure 3A:
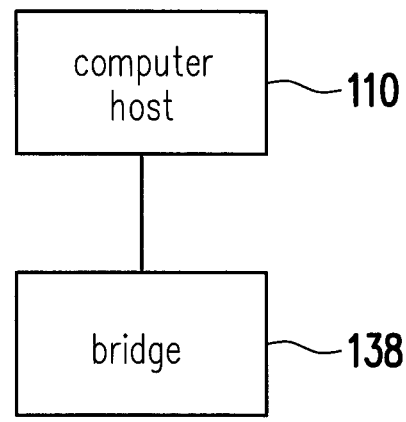
FIG. 3A and FIG. 3B illustrate an example of a virtual function assigning method according to an embodiment of the invention.
Figure 3B:
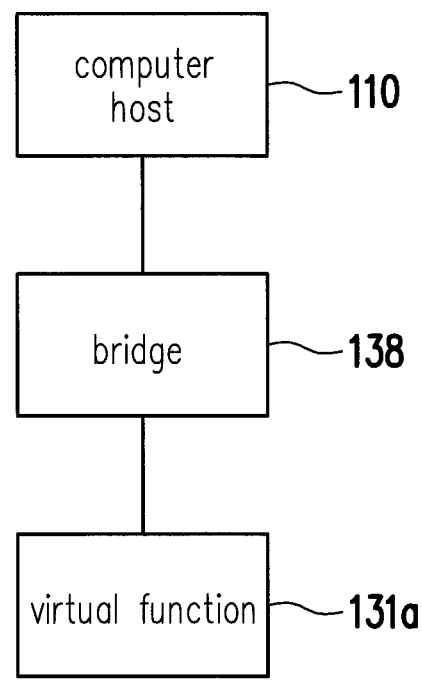

The management processor 135 of the management host 130 updates the mapping table according to the virtual function establishing request and connects a part of or all of the virtual functions to the corresponding bridge (e.g. the bridges 138 and 139 of FIG. 1 and the bridge 290 of FIG. 2). The following embodiments explain the connection allocation of the virtual functions and the pseudo bridge. FIG. 3A and FIG. 3B illustrate an example of a virtual function assigning method according to an embodiment of the invention. Referring to FIG. 1 and FIG. 3A, the bridge 138 connects the computer host 110. The bridge 138 supports the hot-plug function. Here, "the bridge 138 supports the hot-plug function" means that the bridge 138 is capable of receiving and sending a specific message, or is provided with specific output and input pins or a status register having a hot-plug event for notifying the computer host 110 whether the hot-plug event occurs.

TABLE 1

| Number of Computer Host (CH) | Virtual Function Address of Computer Host End (CH-B/D/F) | Virtual Function Address of Management Host End (M-B/D/F) | Status Message (EN) |
|---|---|---|---|
| N/A | N/A | N/A | 0 |

Further, with reference to Table 1, Table 1 is the mapping table corresponding to the status of FIG. 3A. The fields in the mapping table of Table 1 are related to the number of the computer host (CH), the virtual function address of the computer host end (CH-B/D/F), and the virtual function address of the management host end (M-B/D/F), which are all "N/A"; and a preset value of the status message (EN) is 0. The virtual function addresses B/D/F of the computer host end and the management host end refer to the PCIe virtual function addresses of Bus/Device/Function; the status message (EN) of 0 indicates "disable" and the status message (EN) of 1 indicates "enable." In other words, according to FIG. 3A and Table 1, the bridge 138 is not yet connected with the virtual function of the device and the computer host 110 cannot use the virtual function. If the computer host 110 issues the configuration command (e.g. read command) including the virtual function address (i.e. B/D/F address) of the computer host end (e.g. X1/Y1/Z1), since the mapping table includes no related information, the software in the management host 130 determines the command invalid (i.e. Miss) and replies a message of "no support" to the computer host through the bridge 138 and the management processor 135. It is worth noticing that, according to the conventional technology, if the bridge is not connected with the virtual function and this bridge does not support the hot-plug function when the system is booted, the software in the computer host cannot use the virtual function behind the bridge due to the software cannot find it when booting. However, the invention solves the above problem by providing the bridge 138 that supports the hot-plug function. An operation of the bridge 138 is explained in detail in the following embodiment.

Referring FIG. 1 and FIG. 3B, when the user's demands change (for example, the user intends to use one or a plurality of virtual functions that are not yet connected with the device), the management processor 135 obtains the virtual function establishing request (i.e. the user's demands) and accordingly modifies the content of the mapping table according to the virtual function establishing request. For example, it is given that the user intends to use a virtual function of a certain device in the computer host 110. For example, referring to Table 2, Table 2 is the mapping table corresponding to the status of FIG. 3B. In the mapping table of Table 2, the number of the computer host 110 is 1 and the CH-B/D/F address of the virtual function is X1/Y1/Z1, and the management processor 135 updates the M-B/D/F address of the management host end in the mapping table correspondingly to X2/Y2/Z2, for example, and modifies the status message (EN) to 1. In addition to the above update of the mapping table, because the bridge 138 of the invention supports the hot-plug function, the change of the user's demands can be obtained through the status register in the bridge 138, receipt of a specific message, or a signal of a specific input pin. Then, after updating the mapping table, the computer host 110 is notified of the hot-plug event through polling of the computer host 110, issuance of the interrupt message, or the output pin of a specific pin, so as to connect the assigned virtual function 131a with the corresponding computer host 110, wherein the virtual function 131a is provided by the I/O virtualization device 131. Thereafter, the computer host 110 scans a PCIe bus corresponding to the bridge and issues the configuration command including the virtual function address (i.e. B/D/F address) of the computer host end (e.g. X1/Y1/Z1) to the management host 130, and then the management processor 135 compares the received configuration command with the content of the mapping table. If the configuration command matches the content of the mapping table and the status message in the mapping table is "enable", the management processor 135 replies the information of the virtual function 131a to the computer host 110 through the switch 137, so as to complete the connection of the virtual function 131a.

TABLE 2

| Number of Computer Host (CH) | Virtual Function Address of Computer Host End (CH-B/D/F) | Virtual Function Address of Management Host End (M-B/D/F) | Status Message (EN) |
|---|---|---|---|
| 1 | X1/Y1/Z1 | X2/Y2/Z2 | 1 |

More specifically, when the bridge 138 receives the configuration command (e.g. the B/D/F address including X1/Y1/Z1), the configuration command is transmitted to the management processor 135. Then, the software of the management processor 135 (e.g. operating system, application program, control program, etc.) compares the configuration command with the information of the mapping table to confirm whether they match (i.e. Hit). If they match and EN=1, the B/D/F address of the computer host end is converted to the B/D/F address of the management host end. For example, the CH-B/D/F address of X1/Y1/Z1 is converted to the M-B/D/F address of X2/Y2/Z2, and the software of the management host end is used instead to generate the configuration command including the B/D/F address of X2/Y2/Z2, such that the software of the management host obtains related data of the virtual function according to the corresponding address. Then, the management processor 135 writes the related data of the virtual function 131a to the bridge 138 and notifies the computer host 110 that this configuration command is completed. By the above method, the virtual function 131a is dynamically connected.

It is worth mentioning that, when the user's demands change, in an embodiment, the management processor 135 writes the related information to the register in the bridge 138 based on a notification of management software of the management host 130. In another embodiment, the management processor 135 transmits the PCIe transaction layer packet (TLP), for example, to the bridge 138. In yet another embodiment, the management processor 135 triggers a pin connected to the bridge 138. However, a method by which the management processor 135 notifies the bridge is not limited to the above. Those skilled in the art may use different methods to notify the bridge 138 depending on the actual situations. When the bridge 138 receives the notification, the management processor 135 transmits the hot-plug events corresponding to different virtual functions to the computer host 110 through the switch 137. In an embodiment, the hot-plug event is the interrupt message (e.g. message signaled interrupt (MSI) and INTx). In another embodiment, the hot-plug event is a status register bit through polling of the computer host 110. For example, the computer host 110 transmits a polling command to the switch 137, and the switch 137 reads the polling command to determine the corresponding bridge 138, so as to read a specific bit in the status register 138b. In yet another embodiment, the hot-plug event is a pin by which the management processor 135 triggers the corresponding computer host 110. For example, the management processor 135 triggers a general purpose input/output (GPIO) pin of the bridge 138 connected to the computer host 110 to notify the GPIO pin of the computer host 110. However, the hot-plug event is not limited to the above examples. Those skilled in the art may vary the hot-plug event to notify the computer host 110 depending on the actual situations.

Figure 4A:
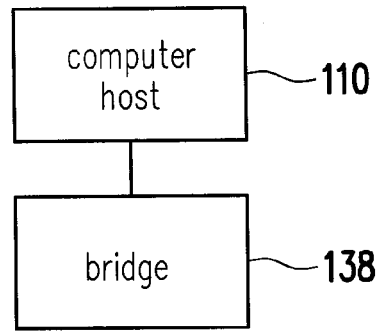
FIG. 4A to FIG. 4C illustrate an example of a virtual function assigning method according to an embodiment of the invention.
Figure 4B:
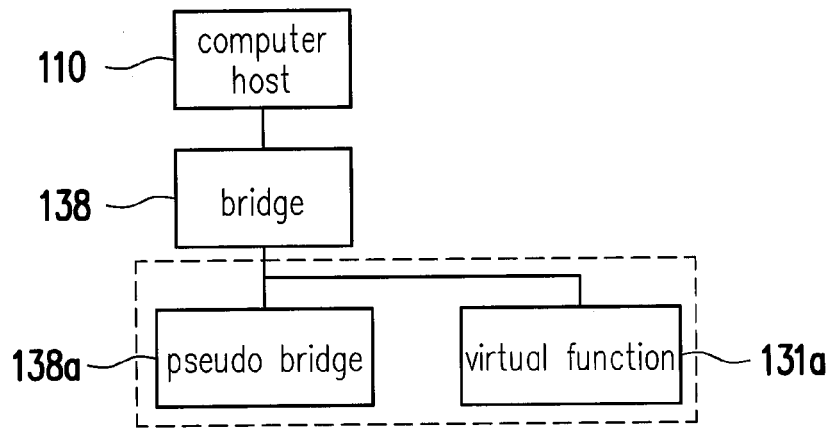
Figure 4C:
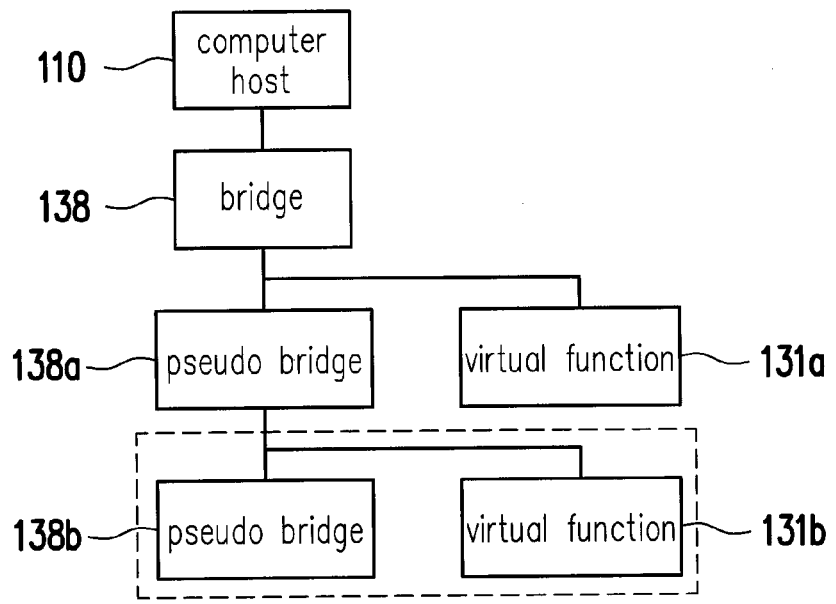

The management processor 135 connects the pseudo bridge in series according to the updated table to establish M levels of pseudo bridges, and M is a positive integer, wherein each of the pseudo bridges connects a part of or all of the virtual functions. Another embodiment is given below to explain the connection allocation of the virtual functions and the pseudo bridges. FIG. 4A to FIG. 4C illustrate an example of a virtual function assigning method according to an embodiment of the invention. With reference to FIG. 1 and FIG. 4A, the bridge 138 and the computer host 110 of FIG. 4A are similar to those of FIG. 3A, and a mapping table of FIG. 4A is similar to Table 1. Thus, details are not repeated hereinafter.

Next, referring to FIG. 4B, in FIG. 4B, when the user's demands change, the management processor 135 simultaneously adds connection of a pseudo bridge 138a which supports the hot-plug function according to the virtual function establishing request (i.e. the user's demands) in addition to adding the connection of the virtual function 131a with one or a plurality of devices. Meanwhile, the information of the pseudo bridge 138a in the mapping table and the information of the virtual function 131a provided by the I/O virtualization device 131 are updated. In other words, the address information of the computer host end and the management host end of the device virtual function are updated. For example, referring to Table 3 which is the mapping table corresponding to the status of FIG. 4B, the CH-B/D/F address in the mapping table of Table 3 is updated to X1/Y1/Z1; the M-B/D/F address is updated to X2/Y2/Z2; and related information of the pseudo bridge 138a is also added. Take the mapping table of Table 3 as an example, for the computer host 110, when the configuration command is issued, the B/D/F address is still included. However, because the bridge of the B/D/F address (e.g. Xp/Yp/Zp address) does not physically exist, the management processor 135 writes data related to the pseudo bridge 138a to the bridge 138 by software simulation and notifies the computer host 110 that the configuration command is completed, such that the management host 130 assigns the pseudo bridge 138a and the virtual function 131a to the computer host 110.

TABLE 3

| Number of Computer Host (CH) | Virtual Function Address of Computer Host End (CH-B/D/F) | Virtual Function Address of Management Host End (M-B/D/F) | Status Message (EN) |
|---|---|---|---|
| 1 | X1/Y1/Z1 | X2/Y2/Z2 | 1 |
| 1 | Xp/Yp/Zp | software | 1 |

It is noted that, in this embodiment, the management processor 135 uses software to simulate the pseudo bridge 138a having the hot-plug function so as to execute the command given by the computer host 110. More specifically, the pseudo bridge 138a is established by the management processor 135 using a software simulation program, a driver module, or a memory in the management host 130. The pseudo bridge 138a is capable of executing the same command that the computer host 110 gives to the physical bridge. Therefore, the system of the computer host 110 deems the pseudo bridge as one physical bridge. It is known from the above that, through the allocation of the pseudo bridge 138a that supports the hot-plug function, the management host 130 can again respond to the change of the user's demands. For example, as shown in FIG. 4C, one or a plurality of virtual functions 131b are added, wherein the virtual function 131b is provided by the I/O virtualization device 131. Moreover, another pseudo bridge 138b may be disposed to keep the expansion capability. In this embodiment, two pseudo bridges 138a and 138b are disposed to form two levels of virtual functions, for example. In other embodiments, those skilled in the art may adjust the number of the pseudo bridges and the virtual functions, the number of the levels, and the allocation of the virtual functions corresponding to the computer host according to the actual situations. For example, a virtual function may be further connected after the pseudo bridge 138b, so as to form three levels of virtual functions. The rest may be configured and connected in the same manner and are not repeated hereinafter. In other words, in this embodiment, addition of each pseudo bridge can expand the virtual function in the next level. Therefore, as long as the I/O virtualization device supports the number of the virtual functions, the virtual functions can be instantly and dynamically expanded.

It is worth mentioning that, in this embodiment, the management processor 135 of the management host 130 updates the mapping table according to a virtual function removing request (for example, the user's demands change and a network adapter is hot-plugged to remove use of the virtual function from the computer host), and the pseudo bridge of an $O^{th}$ level is removed according to the mapping table, wherein O is a positive integer and $1 \leq O \leq M$. The management host removes the pseudo bridges in sequence from the pseudo bridge of an $M^{th}$ level to the pseudo bridge of the $O^{th}$ level, and respectively transmits the hot-plug event related to the removal of the pseudo bridges of the respective levels to the corresponding at least one computer host. In other words, to stop the virtual function of one specific level, the virtual functions need to be removed in sequence starting from the virtual function of the lowermost level until the virtual function of the specific level.

Further, in another embodiment, the management processor 135 of FIG. 1 may establish N pseudo bridges on the bus of the bridges 138 and 139 in advance, wherein N is a positive integer. The management processor 135 connects the bridges 138 and 139 to the N pseudo bridges, and each of the N pseudo bridges connects a part of or all of the virtual functions and/or another pseudo bridge other than the N pseudo bridges. Another embodiment is given below to explain the connection allocation of the virtual functions and the pseudo bridges.

Figure 5A:
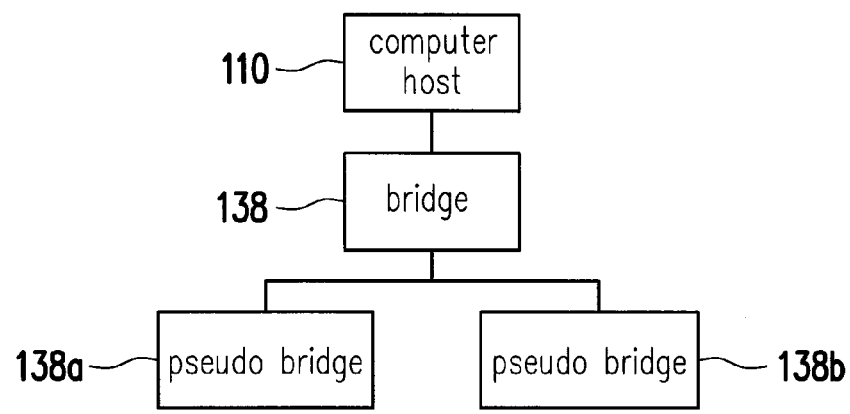
FIG. 5A and FIG. 5B illustrate an example of a virtual function assigning method according to another embodiment of the invention.
Figure 5B:
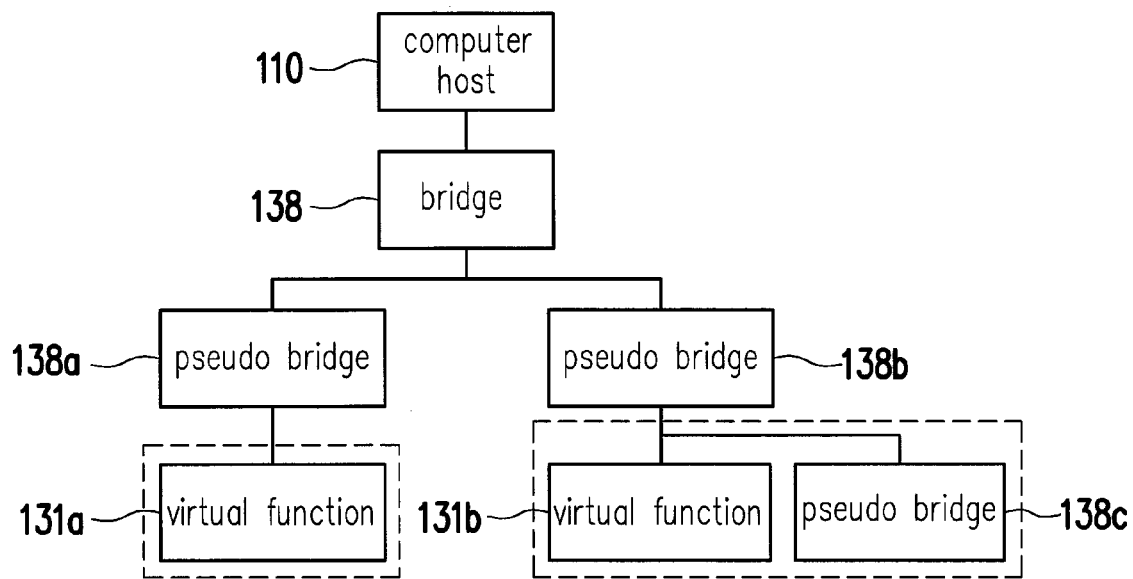

FIG. 5A and FIG. 5B illustrate an example of a virtual function assigning method according to another embodiment of the invention. Referring to FIG. 1 and FIG. 5A, the bridge 138 and the computer host 110 of FIG. 5A are similar to those of FIG. 3A. Thus, details of the bridge 138 and the computer host 110 of FIG. 5A are not repeated hereinafter. A difference between FIG. 5A and FIG. 3A is that: the bridge 138 of FIG. 5A is provided with pseudo bridges 138a and 138b that support the hot-plug function in advance according to the user's demands, wherein the number of the pseudo bridges 138a and 138b corresponding to the bridge 138 is a preset value, and the maximum of the preset value is determined by the number of the virtual functions that the I/O virtualization device can support. In addition, because the number of the pseudo bridges is the preset value, the bridge 138 is not required to provide the function of expanding and connecting further virtual functions, and therefore, the bridge 138 may or may not support the hot-plug function.

TABLE 4

| Number of Computer Host (CH) | Virtual Function Address of Computer Host End (CH-B/D/F) | Virtual Function Address of Management Host End (M-B/D/F) | Status Message (EN) |
|---|---|---|---|
| 1 | Xp/Yp/Zp | software | 1 |
| 1 | Xq/Yq/Zq | software | 1 |

Furthermore, referring to Table 4, Table 4 is the mapping table corresponding to the status of FIG. 5A. In the mapping table of Table 4, the CH-B/D/F address information corresponding to the pseudo bridges 138a and 138b is Xp/Yp/Zp and Xq/Yq/Zq. For the computer host 110, when the configuration command is issued, the B/D/F (e.g. Xp/Yp/Zp, Xq/Yq/Zq) address is still included. However, because the pseudo bridges 138a and 138b do not physically exist, the management processor 135 write related data of the pseudo bridges 138a and 138b to the bridge 138 by software simulation and notifies the computer host 110 that the configuration command is completed through the switch 137. The pseudo bridges 138a and 138b support the hot-plug function and are simulated by the management processor 135 using software. Before being updated, the content of the mapping table already includes information of the pseudo bridges 138a and 138b.

Next, with reference to FIG. 5B, in FIG. 5B, the user's demands change, and the management processor 135 further adds the virtual function 131b of one or a plurality of devices, which is connected with the pseudo bridge 138b disposed in advance and the pseudo bridge 138c that supports the hot-plug function according to the virtual function establishing request (i.e. the change of the user's demands), in addition to adding the virtual function 131a of one or a plurality of devices, which is connected with the pseudo bridge 138a disposed in advance. In addition to the update of the addresses of the computer host end and the management host end related to the virtual function in the mapping table, for example, referring to Table 5, Table 5 is the mapping table corresponding to the status of FIG. 5B. As compared with Table 4, the mapping table of Table 5 further includes related information of the virtual function 131a of the device (the CH-B/D/F address is X1/Y1/Z1 and the M-B/D/F address is X2/Y2/Z2) and related information of the virtual function 131b of the device (the CH-B/D/F address is X3/Y3/Z3 and the M-B/D/F address is X4/Y4/Z4).

TABLE 5

| Number of Computer Host (CH) | Virtual Function Address of Computer Host End (CH-B/D/F) | Virtual Function Address of Management Host End (M-B/D/F) | Status Message (EN) |
|---|---|---|---|
| 1 | Xp/Yp/Zp | software | 1 |
| 1 | Xq/Yq/Zq | software | 1 |
| 1 | X1/Y1/Z1 | X2/Y2/Z2 | 1 |
| 1 | X3/Y3/Z3 | X4/Y4/Z4 | 1 |
| 1 | Xs/Ys/Zs | software | 1 |

In addition, take Table 5 as an example, for the computer host 110, when the configuration command is issued, the B/D/F address is still included. However, because the pseudo bridge 138c of the B/D/F address (e.g. Xs/Ys/Zs address) does not physically exist, the management processor 135 writes related data of the pseudo bridge 138c to the bridge 138 by software simulation and notifies the computer host 110 that the configuration command is completed. In this embodiment, the connection of the pseudo bridge 138c and the virtual functions 131a and 131b and the notification of the hot-plug event to the computer host 110 have been specified in the descriptions of FIG. 3A to FIG. 4C and are not repeated hereinafter.

In other embodiments, the virtual functions 131a and 131b may not be respectively connected with the pseudo bridges 138a and 138b at the same time, which depends on the number of available virtual functions at the moment. In other words, although a plurality of pseudo bridges having the hot-plug function are connected with the bridge 138 by software simulation, not all the virtual functions corresponding to the pseudo bridges are used by the virtual machine. In some situations, the pseudo bridges not connected with virtual functions are prepared in reserve and will be connected through the mapping table when the virtual machine requires the corresponding virtual functions, so as to achieve the efficiency of instant hot-plug.

Further, when compared with FIG. 4A and FIG. 4B, in this embodiment of FIG. 5A and FIG. 5B, the management processor 135 of the management host 130 updates the mapping table according to the virtual function removing request (e.g. a network adapter is hot-plugged to remove this virtual function from the computer host) and directly transmits the hot-plug event related to the removal of a part of or all of the virtual functions to the corresponding at least one computer host according to the mapping table. In other words, the related connection may be directly removed to stop one of the virtual functions (e.g. the virtual functions 131a and 131b).

It is known from the above that, through the allocation of the pseudo bridges 138a and 138b that support the hot-plug function in advance, the management host can again respond to the change of the user's demands. For example, one or a plurality of virtual functions 131a and 131b may be added as shown in FIG. 5B. Another pseudo bridge 138c may also be disposed to keep the expansion capability. In this embodiment, two pseudo bridges 138a and 138b are disposed in advance, for example. In other embodiments, those skilled in the art may adjust the number of the pseudo bridges that are disposed in advance, the number of the pseudo bridges and virtual functions, the number of the levels, and the allocation of the virtual functions corresponding to the computer host according to the actual situations. For example, a pseudo bridge may be further connected after the bridge 138, so as to dispose three pseudo bridges in advance. The rest may be configured and connected in the same manner and are not repeated hereinafter. Moreover, in this embodiment, the pseudo bridges are connected in series as described with reference to FIG. 4B, so as to expand virtual functions in the next level. In other words, the connection of the pseudo bridges 138a and 138b is similar to the embodiment of FIG. 4B. Thus, the effect of instantly expanding the virtual functions is achieved. If the number of the pseudo bridges that are prepared in advance by simulation in the embodiment of FIG. 5A is insufficient, expansion may be carried out by the method of FIG. 5B. It is noted that, in order to achieve the aforementioned instant expansion function, the pseudo bridges need to support the hot-plug function. Therefore, as long as the I/O virtualization device supports the number of the virtual functions, the virtual functions can be instantly and dynamically expanded.

It is worth noticing that, besides using the hot-plug event to connect the virtual function and the pseudo bridge, in an embodiment, after the management host 130 is booted, the virtual functions and the pseudo bridges are assigned to the computer hosts 110 and 115 according to the mapping table, and the pseudo bridges having the hot-plug function are established by the aforementioned software simulation. After booting the computer hosts 110 and 115, an enumeration process is executed, and the computer hosts 110 and 115 inquire the connection allocation of the PCIe device (e.g. the virtual functions and the pseudo bridges) in the management host 130, such that the computer hosts 110 and 115 respectively obtain the connection allocation of the virtual functions and the pseudo bridges connected with the computer hosts 110 and 115 in the management host 130.

Figure 6:
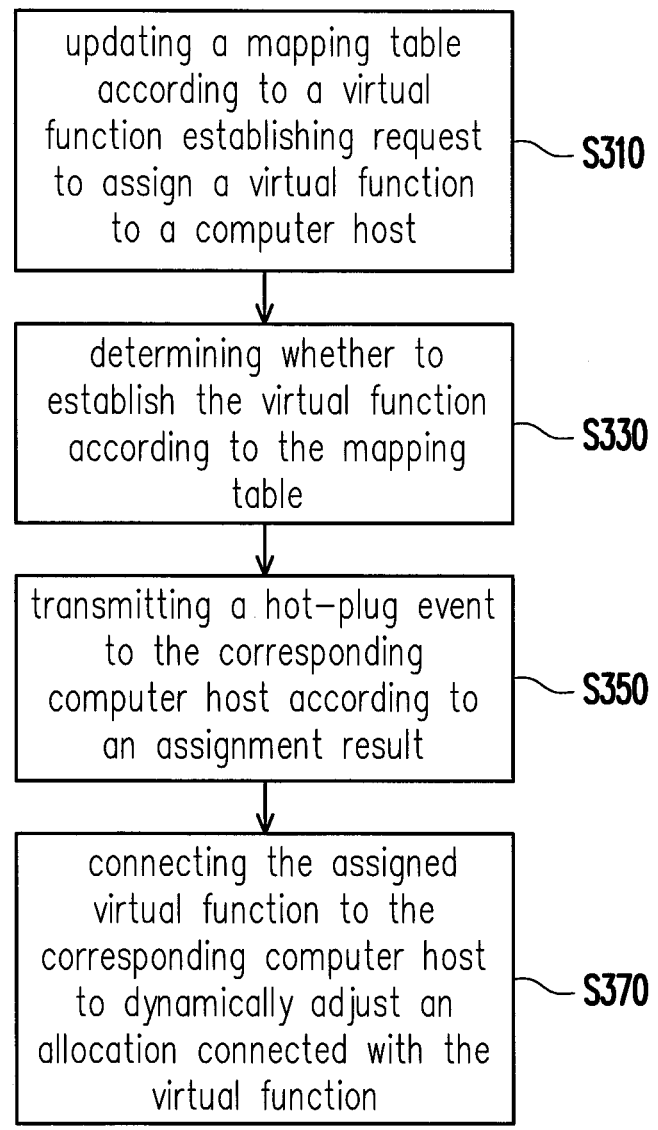
FIG. 6 is a flowchart illustrating a virtual function assigning method according to an embodiment of the invention.

On the other hand, FIG. 6 is a flowchart illustrating a virtual function assigning method according to an embodiment of the invention. With reference to FIG. 6, this embodiment is adapted for the management host 130 and the computer hosts 110 and 115 in the virtual function assigning system 100 shown in FIG. 1. A controlling method of the management host 130 includes the following. The management processor 135 of the management host 130 updates the mapping table according to the virtual function establishing request (e.g. the user hot-plugs a network adapter and intends to use the additional virtual function in the computer host) and assigns the virtual function to the computer hosts 110 and 115 (Step S310). The management processor 135 determines whether to establish the virtual function according to the mapping table (Step S330). The management processor 135 transmits the hot-plug event to the corresponding computer hosts 110 and 115 through the switch 137 according to the assignment result (Step S350). The management processor 135 connects the virtual function to the corresponding computer hosts 110 and 115 through the bridge, so as to dynamically adjust the allocation of the virtual function (Step S370). Steps of the virtual function assigning method may be varied according to the situation of implementation and are not limited to the above. Details of the above steps are specified in the embodiments of FIG. 1 to FIG. 5B and are not repeated hereinafter.

To conclude the above, the virtual function assigning system and method and the management host of the invention assign the pseudo bridge and virtual function to the computer host by the management processor, the I/O virtualization device, and the mapping table. The management processor simulates the pseudo bridge and provides the pseudo bridge with the hot-plug function. The pseudo bridge may be further connected with other virtual functions and utilize the hot-plug event set in the hot-plug function to notify the computer host, assigned to the pseudo bridge, of the connection condition of the virtual function. Accordingly, the virtual function assigning system is capable of quickly and dynamically adjusting the connection allocation of the virtual functions, so as to achieve the maximum efficiency in assigning hardware resources.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:
1. A virtual function assigning system, comprising:
at least one computer host; and a management host connected with the at least one computer host through a bridge and having at least one virtual function, and the management host updating a mapping table according to a virtual function establishing request to assign the at least one virtual function to the at least one computer host, wherein the management host determines whether to establish the at least one virtual function according to the mapping table, a content of mapping table comprises a status message, and the management host transmits a hot-plug event to the corresponding at least one computer host according to an assignment result and connects the assigned at least one virtual function with the corresponding at least one computer host to dynamically adjust an allocation connected with the at least one virtual function, wherein when the management host connects the assigned at least one virtual function to the corresponding at least one computer host, the at least one computer host issues a configuration command comprising the virtual function address of the computer host end to the management host, and the management host compares the configuration command with the content of the mapping table, wherein if the configuration command and the content of the mapping table match each other and the status message in the mapping table is "enable," the management host replies information of the at least one virtual function to the at least one computer host to complete connection of the at least one virtual function.

2. The virtual function assigning system according to claim 1, wherein the hot-plug event comprises one of the following or a combination of the following: the management host transmitting an interrupt message to the corresponding at least one computer host, the management host providing a bit of a status register be polling by the corresponding at least one computer host, and the management host triggering a pin of the corresponding at least one computer host.

3. The virtual function assigning system according to claim 1, wherein when the management host determines whether to establish the at least one virtual function according to the mapping table, the content of the mapping table further comprises a number of the computer host, a virtual function address of a computer host end, and a virtual function address of a management host end.

4. The virtual function assigning system according to claim 1, wherein the bridge supports a hot-plug function, and the at least one virtual function is provided by a device that supports a single root I/O virtualization technology.

5. The virtual function assigning system according to claim 1, wherein when the management host updates the mapping table according to the virtual function establishing request, the updated content of the mapping table comprises information of at least one pseudo bridge and information of the at least one virtual function of the device that supports the single root I/O virtualization technology, such that the management host assigns the at least one pseudo bridge and the at least one virtual function to the at least one computer host.

6. The virtual function assigning system according to claim 5, wherein the at least one pseudo bridge is simulated by the management host by software, and the at least one pseudo bridge supports the hot-plug function.

7. The virtual function assigning system according to claim 5, wherein the management host updates the mapping table according to the virtual function establishing request and connects a plurality of pseudo bridges in series to establish pseudo bridges of M levels, and M is a positive integer, wherein each of the pseudo bridges connects a part of or all of the at least one virtual function.

8. The virtual function assigning system according to claim 7, wherein the management host updates the mapping table according to a virtual function removing request and removes the pseudo bridge of an O level according to the mapping table, wherein O is a positive integer, and the management host removes the pseudo bridges in sequence from the pseudo bridge of an M level to the pseudo bridge of the O level, and respectively transmits the hot-plug event related to the removal of the pseudo bridge of each level to the corresponding at least one computer host.

9. The virtual function assigning system according to claim 1, wherein the management host further comprises N pseudo bridges that are established, and N is a positive integer, wherein the management host connects the bridge to the N pseudo bridges, and each of the N pseudo bridges connects a part of or all of the at least one virtual function and/or another pseudo bridge other than the N pseudo bridges.

10. The virtual function assigning system according to claim 9, wherein the pseudo bridges are simulated by the management host by software, and the content of the mapping table, before being updated, comprises information of the pseudo bridges.

11. The virtual function assigning system according to claim 9, wherein the pseudo bridges support the hot-plug function.

12. The virtual function assigning system according to claim 9, wherein the management host updates the mapping table according to the virtual function removing request and directly transmits the hot-plug event related to the removal of a part of or all of the at least one virtual function to the corresponding at least one computer host.

13. A virtual function assigning method, comprising:
updating a mapping table according to a virtual function establishing request to assign at least one virtual function to at least one computer host;
determining whether to establish the at least one virtual function according to the mapping table, wherein a content of mapping table comprises a status message;
transmitting a hot-plug event to the corresponding at least one computer host according to an assignment result; and
connecting the assigned at least one virtual function to the corresponding at least one computer host through a bridge to dynamically adjust an allocation connected with the at least one virtual function, comprising:
the at least one computer host issuing a configuration command comprising the virtual function address of the computer host end to the management host; and
comparing the configuration command with the content of the mapping table, wherein if the configuration command and the content of the mapping table match each other and the status message in the mapping table is "enable," information of the at least one virtual function is replied to the at least one computer host to complete connection of the at least one virtual function.

14. The virtual function assigning method according to claim 13, wherein the hot-plug event comprises one of the following or a combination of the following: transmitting an interrupt message to the corresponding at least one computer host, performing polling on a status register bit through the corresponding at least one computer host, and triggering a pin of the corresponding at least one computer host.

15. The virtual function assigning method according to claim 13, wherein the step of determining whether to establish the at least one virtual function according to the mapping table comprises:
the content of the mapping table further comprises a number of the computer host, a virtual function address of a computer host end, and a virtual function address of a management host end.

16. The virtual function assigning method according to claim 13, wherein the bridge supports the hot-plug function, and the at least one virtual function is provided by a device that supports a single root I/O virtualization technology.

17. The virtual function assigning method according to claim 13, wherein the step of updating the mapping table according to the virtual function establishing request to assign the at least one virtual function to the at least one computer host comprises:
the updated content of the mapping table comprises information of at least one pseudo bridge and information of the at least one virtual function of the device that supports the single root I/O virtualization technology, so as to assign the at least one pseudo bridge and the at least one virtual function to the at least one computer host.

18. The virtual function assigning method according to claim 17, wherein the step of assigning the at least one pseudo bridge and the at least one virtual function to the at least one computer host comprises:
simulating the at least one pseudo bridge by software of the management host, wherein the at least one pseudo bridge supports the hot-plug function.

19. The virtual function assigning method according to claim 17, wherein the step of assigning the at least one pseudo bridge and the at least one virtual function to the at least one computer host comprises:
updating the mapping table according to the virtual function establishing request and connecting a plurality of pseudo bridges in series according to the mapping table to establish pseudo bridges of M levels, wherein M is a positive integer, and each of the pseudo bridges connects a part of or all of the at least one virtual function.

20. The virtual function assigning method according to claim 19, wherein after the step of updating the mapping table according to the virtual function establishing request and connecting the pseudo bridges in series according to the mapping table to establish the pseudo bridges of M levels, the virtual function assigning method further comprises:
updating the mapping table according to a virtual function removing request and removing the pseudo bridge of an O level according to the mapping table, wherein O is a positive integer and 1≤O≤M, and the pseudo bridges are removed in sequence from the pseudo bridge of an M level to the pseudo bridge of the O level, and the hot-plug event related to the removal of the pseudo bridge of each level is respectively transmitted to the corresponding at least one computer host.

21. The virtual function assigning method according to claim 13, wherein the step of updating the mapping table according to the virtual function establishing request to assign the at least one virtual function to the at least one computer host further comprises:
establishing N pseudo bridges, wherein N is a positive integer; and
connecting the bridge to the N pseudo bridges, and each of the N pseudo bridges connecting a part of or all of the at least one virtual function and/or another pseudo bridge other than the N pseudo bridges.

22. The virtual function assigning method according to claim 21, wherein the step of connecting the bridge to the N pseudo bridges, and each of the N pseudo bridges connecting a part of or all of the at least one virtual function and/or another pseudo bridge other than the N pseudo bridges comprises:
simulating the pseudo bridges by software, and the content of the mapping table, before being updated, comprising information of the pseudo bridges.

23. The virtual function assigning method according to claim 21, wherein the pseudo bridges support the hot-plug function.

24. The virtual function assigning method according to claim 21, wherein after the step of connecting the bridge to the N pseudo bridges, and each of the N pseudo bridges connecting a part of or all of the at least one virtual function and/or another pseudo bridge other than the N pseudo bridges, the virtual function assigning method further comprises:
updating the mapping table according to the virtual function removing request and directly transmitting the hot-plug event related to the removal of a part of or all of the at least one virtual function to the corresponding at least one computer host.

25. A management host, comprising:
a switch comprising a plurality of bridges, wherein the bridges are respectively coupled to at least one corresponding computer host;
an I/O virtualization device coupled to the switch and having at least one virtual function; and
a management processor coupled to the switch and updating a mapping table according to a virtual function establishing request to assign the at least one virtual function to the at least one computer host, wherein
the management processor determines whether to establish the at least one virtual function according to the mapping table,
a content of mapping table comprises a status message, and
the management processor transmits a hot-plug event to the corresponding at least one computer host through the switch according to an assignment result, the at least one computer host issues a configuration command comprising the virtual function address of the computer host end to the management host, and the management processor compares the configuration command with the content of the mapping table, wherein if the configuration command and the content of the mapping table match each other and the status message in the mapping table is "enable," the management processor replies information of the at least one virtual function to the at least one computer host, and
the management host connects the assigned at least one virtual function with the corresponding at least one computer host through the switch to dynamically adjust an allocation of the at least one virtual function.

26. The management host according to claim 25, wherein the hot-plug event comprises one of the following or a combination of the following: the management processor transmitting an interrupt message to the corresponding at least one computer host through the switch, the management processor providing a bit of a status register to be polling by the corresponding at least one computer host, and the management processor triggering a pin of the corresponding at least one computer host through the switch.

27. The management host according to claim 25, wherein when the management processor determines whether to establish the at least one virtual function according to the mapping table, the content of the mapping table further comprises a number of the computer host, a virtual function address of a computer host end, and a virtual function address of a management host end.

28. The management host according to claim 25, wherein the bridge supports a hot-plug function, and the at least one virtual function is provided by a device that supports a single root I/O virtualization technology.

29. The management host according to claim 25, wherein when the management processor updates the mapping table according to the virtual function establishing request, the updated content of the mapping table comprises information of at least one pseudo bridge and information of the at least one virtual function of the device that supports the single root I/O virtualization technology, such that the management processor assigns the at least one pseudo bridge and the at least one virtual function to the at least one computer host.

30. The management host according to claim 29, wherein the at least one pseudo bridge is simulated by the management processor by software, and the at least one pseudo bridge supports the hot-plug function.

31. The management host according to claim 29, wherein the management processor connects a plurality of pseudo bridges in series according to the mapping table to establish pseudo bridges of M levels, and M is a positive integer, wherein each of the pseudo bridges connects a part of or all of the at least one virtual function.

32. The management host according to claim 31, wherein the management processor updates the mapping table according to a virtual function removing request and removes the pseudo bridge of an O level according to the mapping table, wherein O is a positive integer and $1 \le O \le M$, and the management processor removes the pseudo bridges in sequence from the pseudo bridge of an M level to the pseudo bridge of the O level, and respectively transmits the hot-plug event related to the removal of the pseudo bridge of each level to the corresponding at least one computer host.

33. The management host according to claim 25, wherein the management processor further comprises N pseudo bridges that are established, and N is a positive integer, wherein the management processor connects the bridge to the N pseudo bridges, and each of the N pseudo bridges selectively connects a part of or all of the at least one virtual function or another pseudo bridge other than the N pseudo bridges.

34. The management host according to claim 33, wherein the pseudo bridges are simulated by the management processor by software, and the content of the mapping table, before being updated, comprises information of the pseudo bridges.

35. The management host according to claim 33, wherein the pseudo bridges support the hot-plug function.

36. The management host according to claim 33, wherein the management processor updates the mapping table according to the virtual function removing request and directly transmits the hot-plug event related to the removal of a part of or all of the at least one virtual function to the corresponding at least one computer host.

* * * * *